Jan. 16, 1968 P. G. S. JOHANSSON 3,363,358

FISHING BAIT

Filed Oct. 18, 1965

United States Patent Office 3,363,358
Patented Jan. 16, 1968

3,363,358
FISHING BAIT
Paul Gustav Seved Johansson, Simlangsdalen, Sweden
Filed Oct. 18, 1965, Ser. No. 496,876
5 Claims. (Cl. 43—42.13)

This invention relates to a fishing bait comprising a body carrying a hook which body is provided with swingable vanes on opposite sides, said vanes at the movement of the bait in the water being moved outwards from and inwards to said body thereby acting as reflection means which effectively draw the attention to the bait.

One object of the invention is to provide a fastening means for said vanes in such a manner that the vanes easily may swing but cannot twist relatively to the body of the bait.

Another object is a joint fastening means for vanes provided on opposite sides of the body.

Still another object is a fastening means which is very cheap to manufacture and which is easy to fit.

Figure 1:
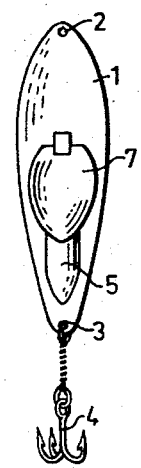
Figure 2:
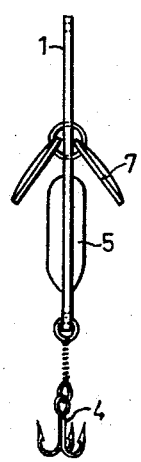
Figure 3:
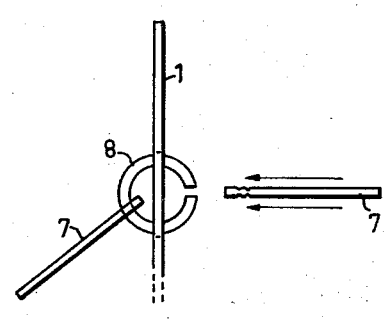
Figure 4:
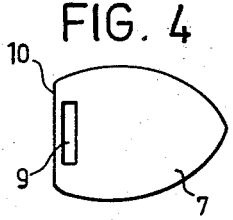
Figure 5:
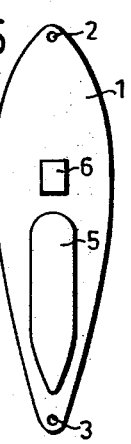
Figure 6:
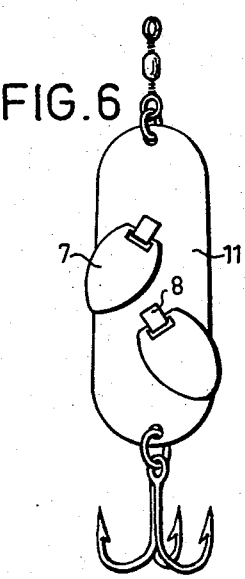

Two embodiments of the invention are illustrated in the accompanying drawing in which:

FIG. 1 shows an elevation of a fishing bait (dibbling-tackle) according to the invention, FIG. 2 is an elevation of the fishing bait in FIG. 1 at right angles thereto, FIG. 3 shows an elevation of part of the bait with a fastening means for a pair of swingable vanes, FIG. 4 is a view of a vane, FIG. 5 is an elevation of the body of the bait in FIG. 1, FIG. 6 is an elevation of another fishing bait according to the invention.

The bait comprises a main body 1 of metal, plastics or a similar suitable material and may be bent in the form of a spoon and is provided with apertures 2 and 3 at the ends for fastening of a fishing line and a hook 4, respectively. A spool-shaped weight 5 is secured to the body 1 and between said weight and the aperture 2 of the body 1 is a rectangular slot 6, the function of which will be described later on.

The body 1 may be manufactured of a reflecting material and for increasing the power of attraction there is a vane 7 swingably mounted on each side of said body 1 in such a manner that the vanes 7 can swing outwards from the body when the bait is moved up and down in the water. The vanes 7 are threaded onto a slotted ring 8 the material of which is of unround cross-section, preferably rectangular, and an aperture 9 at one end of the vane 7 has the same shape as the cross-section of said ring 8 but is slightly larger so that the vane 7 is guided for swinging movement on said ring. When mounting the vanes 7 onto the ring 8 one of the vanes 7 is threaded on the ring 8 and thereafter said ring is entered into the slot 6 of the body 1 with the central axis of the ring at right angles to the longitudinal direction of the body 1. After that the vane 7 on the opposite side of the body 1 can be threaded onto the ring 8 through the slot thereof. When said slot of the ring 8 is clamped together the ring 8 with the vanes 7 is irremovably connected to the body without any other fastening means.

The ring 8 may be manufactured of a resilient material so that it, after threading of the vanes, will shut the slot by itself. The shape of the slot 6 shall be such that the width thereof is slightly greater than the width of the ring 8, whereas the length of the slot 6 in the longitudinal direction of the body 1 is slightly greater than the diameter of the clamped ring. The vanes 7 may be plane or slightly cup-shaped and the edge 10 near the aperture 9 is straightly cut at right angles to the longitudinal direction of the vane so that said edge will guide the vane 7 against the side of the body 1.

The function of the bait is as follows. When the bait is kept still in the water or is drawn upwards the vanes 7 lie along the sides of the body 1 but when lowered down the vanes will swing outwards-upwards so that the vanes at attracting movements of the bait will swing up and down thereby creating irregular reflections which make the bait visible in a long distance. When fishing from a boat the rocking is sufficient to move the vanes without any attracting movements of the bait. Besides, when the vanes strike the body a sound is created which contributes to call the attention of the fish to the bait.

The invention also may be applied to trolling-spoons and similar fishing-tackles. As shown in FIG. 6 the vanes are mounted obliquely to the longitudinal direction of the spoon 11 by arranging the slot of the spoon for the ring 8 at an angle to the pulling direction and the vanes extend slightly beyond the side edge of the spoon. If desirable several pairs of vanes 7 may be arranged behind each other having the vanes directed obliquely outwards towards each side edge of the spoon. As the shape of the spoon will cause a swinging movement of the tackle the vanes will swing outwards and inwards during pulling in the water whereby the reflections desired will be obtained.

What I claim is:

1. A fishing bait comprising an elongated body carrying a hook and provided with swingable elongated vanes, said body having a slot of rectangular shape, a ring the material of which is of unround cross-section being entered into said slot and having its central axis at an angle to the longitudinal direction of the body, and a pair of said vanes mounted on said ring one on each side of the body, said vanes being provided with a mounting aperture having the same shape as the cross-section of the material of said ring but slightly larger than said cross-section.

2. A fishing bait according to claim 1, in which the cross-section of the material of the ring is rectangular and the edge of the vane near the aperture thereof is straightly cut at right angles to the longitudinal direction of the vane.

3. A fishing bait according to claim 1, in which said vanes are cup-shaped.

4. A fishing bait according to claim 1, in which several pairs of said vanes are similarly mounted and arranged behind each other in the longitudinal direction of the body of the bait.

5. A fishing bait according to claim 1, in which the vanes are directed obliquely to the longitudinal direction of the body of the bait and extending beyond the side edge of said body.

References Cited

UNITED STATES PATENTS

| 1,603,118 | 10/1926 | Knill | 43—42.15 |
| 1,677,176 | 7/1928 | Donaly | 43—42.13 |
| 1,830,080 | 11/1931 | Allen | 43—42.31 X |
| 1,832,037 | 11/1931 | Meehan | 43—42.13 |
| 2,665,514 | 1/1954 | James | 43—42.13 |

FOREIGN PATENTS 989,129   5/1951   France.

SAMUEL KOREN, Primary Examiner.
J. H. CZERWONKY, Assistant Examiner.